(12) United States Patent
Danziger et al.

(10) Patent No.: US 6,292,297 B1
(45) Date of Patent: *Sep. 18, 2001

(54) MULTILEVEL DIFFRACTIVE OPTICAL ELEMENT

(75) Inventors: Yochay Danziger, Rishon LeZion; Erez Hasman, Kiron; Asher Friesem, Rehovot, all of (IL)

(73) Assignee: Yeda Research and Development Co., Ltd., Rehovot (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,064
(22) PCT Filed: Sep. 4, 1996
(86) PCT No.: PCT/IL96/00097
  § 371 Date: May 11, 1998
  § 102(e) Date: May 11, 1998
(87) PCT Pub. No.: WO97/12264
  PCT Pub. Date: Apr. 3, 1997

(30) Foreign Application Priority Data

Sep. 14, 1995 (IL) ......................................................... 115295

(51) Int. Cl.$^7$ ............................. G02B 5/18; G02B 27/44
(52) U.S. Cl. ........................ 359/575; 359/569; 359/566; 359/571; 359/573
(58) Field of Search ................................... 359/575, 565, 359/566, 571, 569, 573

(56) References Cited

U.S. PATENT DOCUMENTS

| | | | |
|---|---|---|---|
| 4,895,790 | 1/1990 | Swanson et al. | 430/321 |
| 5,073,007 | 12/1991 | Kedmi et al. | 359/565 |
| 5,202,775 | 4/1993 | Feldman et al. | |
| 5,227,915 | 7/1993 | Grossinger et al. | 359/565 |
| 5,310,623 | 5/1994 | Gal | 430/321 |
| 5,482,800 | 1/1996 | Gal | |

FOREIGN PATENT DOCUMENTS 0 649 037 A2   4/1995 (EP) .

OTHER PUBLICATIONS

J.A.Jordan, P.M.Hirsch, L.B.Lesem and D.L.VanRooy "Kinoform Lenses" Applied Optics; vol. 9, No. 8; Aug. 1970; pp. 1883–1887.

B.R.Brown and A.W.Lohmann; "Complex Spatial Filtering With Binary Masks"; Applied Optics; vol. 5, No. 6; Jun. 1996; p. 967.

Primary Examiner—Audrey Chang
(74) Attorney, Agent, or Firm—Nath & Associates PLLC; Gary M. Nath; Harold L. Novick (57) ABSTRACT

A multilevel diffractive optical element comprising a base and a plurality of phase zones having phase levels of a substantially identical height h, each phase zone being defined by a local modulation depth d and a local number of phase levels $\xi=d/h$, the local number of phase levels $\xi$ per phase zone being a real number, an integer of which defines the number of complete levels in the phase zone, which complete levels have identical widths, and a fraction of which, in at least one phase zone, defines an incomplete level which is narrower than the complete levels, said local number of phase levels $\xi=\xi(x, y)$ varying among different phase zones so as to provide corresponding variation of said local modulation depth $d=d(x, y)$ whereby local diffraction efficiencies and consequently an overall diffraction efficiency of the optical element is arbitrarily controlled.

13 Claims, 6 Drawing Sheets

MULTILEVEL DIFFRACTIVE OPTICAL ELEMENT

FIELD OF THE INVENTION

The present invention relates to a multilevel diffractive optical element (DOE), in particular to a computer generated phase DOE, comprising a substrate with a substantially periodic transmissive or reflective relief pattern of phase retardation zones.

BACKGROUND OF THE INVENTION

Computer generated DOEs of the above kind are capable of performing complicated phase transformations of a radiation wave incident thereon such as a conversion of incident radiation wavefront having one shape into a wavefront of any other shape. DOEs of the specified kind are usually designed to have a high diffraction efficiency at a predetermined, most often, first diffraction order.

In order to obtain 100% diffraction efficiencies, DOEs suggested by Jordan et al and known as kinoforms have a periodic blazed surface relief with phase zones having a continuous profile ("Kinoform lenses", Appl. Opt., 9/8, August 1970, pp. 1883–1887). The depth of the phase zones in kinoforms is generally proportional to phase residues after modulo $2\pi$ so that, in each phase zone, phase variations range is from 0 to $2\pi$. However, it is practically very difficult to produce high quality kinoforms with properly shaped continuous blazed profile.

It has, therefore, been suggested to quantize the ideal continuous phase profile of the DOEs into discrete phase levels as an approximation to the continuous profile. Manufacturing of such a multilevel DOE is based on a generation of a plurality of binary amplitude masks and their serial use for serial etching of a plurality of levels over the entire optical element. Thus, for example, a multilevel DOE disclosed in U.S. Pat. No. 4,895,790, is produced by means of M masks in M serial manufacturing cycles so that, at each manufacturing cycle, each previously produced level is divided into two levels with a smaller distance therebetween. Thereby, in each phase zone of the DOE, there are produced $N=2^M$ levels spaced by identical distances having and boundaries defining equiphase areas of the DOE. However, due to the fact that in such a multilevel DOE, all the phase zones have identical depth and number of phase levels, an amplitude of the diffracted wavefront cannot be changed independently of its phase and therefore, a desired distribution of overall diffraction efficiency of such a DOE cannot be achieved. Furthermore, when a multilevel DOE of the above kind has a varying grating period, such as for example in case of high numerical aperture diffractive lenses, maximal local diffraction efficiencies cannot be simultaneously obtained from all the phase zone, whereby overall diffraction efficiency of the DOE is reduced.

To provide for an independent control of an amplitude of diffracted wavefront, in a binary DOE, Brown, B. R. and Lohmann, A, W. have suggested a DOE in which the amplitude of the diffracted wavefront is controlled by an appropriate choice of the ratio between the widths of the levels (Brown, B. R. and Lohmann, A, W., "Complex spatial filtering of binary masks", Applied Optics, 5 June 1966, p. 967). However, with the number of phase levels being limited to two, the diffraction efficiency of the DOE cannot exceed 40.5%.

It is the object of the present invention to provide a new computer generated multilevel phase diffractive optical element, in which local diffraction efficiencies and consequently an overall diffraction efficiency can be arbitrarily controlled in the range from 0 to nearly 100% over the entire element.

SUMMARY OF THE INVENTION

In the following description and claims the term "profile" used with respect to a multilevel phase zone of a diffractive optical element means a line passing through extremities of phase levels of the phase zone. The term "modulation depth" of a multilevel phase zone means a distance from the uppermost level of the phase zone to a base of the diffractive optical element. The term "optimal modulation depth" with respect to a multilevel phase zone means a modulation depth proportional to phase residues after modulo $2\pi$, which the phase zone would have, in order to ensure 100% diffraction efficiency in an m-th diffraction order, if the phase zone were continuous rather than multilevel. When a multilevel phase zone has such an optimal modulation depth, an angle of inclination of its profile with respect to the base of the diffractive optical element is optimal and a diffraction efficiency provided thereby is nearly 100% The term "local" with respect to any feature of a diffractive optical element is used to designate a magnitude or value which this feature has at one specific location of the diffractive element. Thus, for example, a local modulation depth of a phase zone is a modulation depth seen in a cross-sectional view of the phase zone taken at one location along the extension thereof.

In accordance with the present invention there is provided a multilevel diffractive optical element comprising a base and a plurality of phase zones defined by a modulation depth and a number of phase levels, the number of the phase levels per phase zone varying at different locations of the element, characterised in that the variation of said number of phase levels is such that the modulation depth, at said different locations, varies in a predetermined manner of the element.

Thus, by the appropriate choice of local modulation depth, according to the present invention, it is ensured that at each location of the diffractive optical element, the phase zone profile is inclined with respect to the base of the element in such a manner that a local amplitude of the diffracted wavefront and, consequently, a local diffraction efficiency obtained from the diffractive optical element, at each said location thereof, have predetermined values.

The required orientation of the phase zone profile may be achieved by pivoting of a profile which forms with the base of the DOE an optimal angle around its central point or one of its edge points or any other, arbitrarily chosen point.

Thus, by virtue of variation of the modulation depth over the entire element, e.g. from phase zone to phase zone and/or within one phase zone along the direction of the extension thereof, any required distribution of diffraction efficiency of the element can be achieved. Particularly, it can be provided that, at any location of the DOE, a local diffraction efficiency in the desired order is nearly 100%. This will happen in case when, at said location of the element, the local modulation depth is of its optimal magnitude.

The local modulation depth at each location of the element is defined by the local number of phase levels at this location and by the distance therebetween. Due to the fact that, in practice, it is extremely complicated to form DOEs having variable distance between levels, in the DOE according to the present invention the distance between of phase levels is preferably invariant over the entire element.

In order to determine a specific magnitude of the distance between phase levels it should be kept in mind that the smaller the distance between phase levels height, the greater the number of phase levels which is required for the provision of a desired modulation depth and that, in order to render the manufacturing of the DOE less complicated and to reduce fabrication errors and scatter noise, it is clearly desirable to minimize the number of phase levels and, consequently to choose a maximal possible distance therebetween. On the other hand, to obtain required diffraction efficiencies, the number of phase levels should not be unduly minimized and therefore, the distance between levels must be sufficiently small, being however not less than that dictated by manufacturing constrains.

In view of the above, it is suggested, according to the present invention, that the distance between phase levels has an optimized magnitude determined as a distance between phase levels of a phase zone in which $d_{opt}/N_{min}$ is of a minimal value, where $d_{opt}$ is a local optimal modulation depth of the phase zone and $N_{min}$ is a minimal local number of levels which this phase zone needs to have in order to achieve the predetermined local diffraction efficiency.

In a preferred embodiment of the present invention, the DOE is adapted for production via the use of M masks in M serial manufacturing cycles, a maximal number of phase levels obtained thereby being $2^M$.

It is the advantage of the present invention that, with the DOE being produced in the above manner, any distribution of the modulation depth and, consequently, any desired distribution of overall diffraction efficiency of the DOE can be achieved.

In accordance with the present invention, there is further provided a method for producing a multilevel diffractive optical element having a phase function $\phi=\phi(x,y)$ and phase zones of different local modulation depth $d=d(x,y)$ defined by different local number of phase levels, the phase levels having of substantially identical h, distance therebetween said method comprising:

generating a plurality of M binary amplitude masks including the multilevel information, the masks being configured to provide, in each phase zone, its local number of phase levels, the number of masks being defined by an integer $N_0$ which is at least not less than a maximal number of phase zone levels per phase zone over the optical element and utilizing the masks' information serially for serial etching of said phase levels into said phase zones of the optical element, a binary amplitude transmittance of the masks being defined as:

$$T_M = t\left\{\sin\left(P\text{Mod}\left[\frac{\Phi}{2\pi}\right]\frac{d}{d_0}\right)\right\}$$

where P is a parameter which is defined by a serial number of a mask, i.e. P=P(M). and which determines a number of boundaries of phase levels provided in each phase zone by this mask, and $d_0$ is a maximal achievable modulation depth:

$$d_0=N_0 \cdot h$$

Preferably, the etching depths for the masks are related by a fixed ratio. Thus, with the DOE being produced in a manner similar to that described in U.S. Pat. No. 4,895,790. $p=2_{M-1}$ and the etching depth produced by a mask is twice the etching depth produced by the preceding mask. If any other method of determining the etching depths of the masks is used, the parameter P will be defined accordingly.

Preferably, the h distance between the phase levels is determined by:

calculating, for each phase zone, an optimal local modulation depth, which the phase zone would have, in order to ensure 100% local diffraction efficiency in the m-th diffraction order, if the phase zone profile were continuous rather than multilevel;

assuming that all the phase zones have their optimal local modulation depths and the distance between the phase levels in the phase zones is a free parameter, calculating local minimal numbers of phase levels which are required to provide for the desired distribution of the diffraction efficiency;

calculating local distance between the phase levels as a result of a division of the optimal local modulation depth of each phase zone by the minimal local number of levels thereof, the local distance of a minimal magnitude being chosen as the optimized distance between the phase levels for the entire optical element.

BRIEF DESCRIPTION OF THE DRAWINGS

For a better understanding of the present invention and to show how the same may be carried out in practice reference will now be made to the accompanying drawings, in which.

DETAILED DESCRIPTION OF THE PREFERRED EMBODIMENTS

Figure 1:
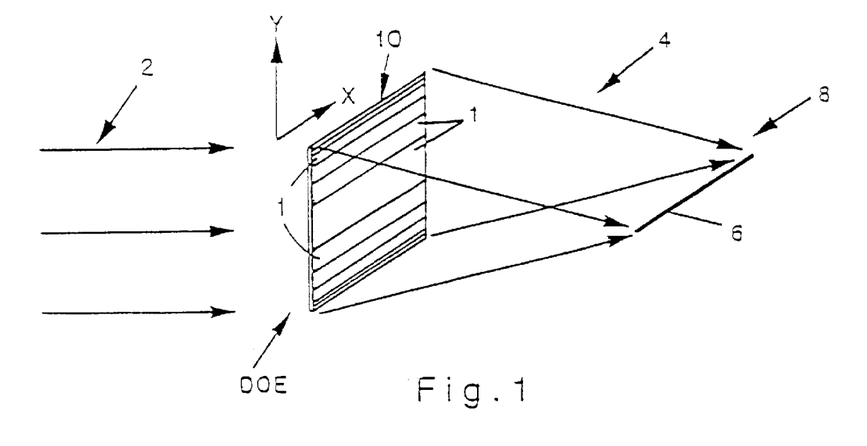
FIG. 1 is a schematic illustration of an example of a diffractive optical element according to the present invention.

FIG. 1 schematically illustrates an example of transparent multilevel phase diffractive optical element (DOE), according to the present invention. The DOE shown in FIG. 1 is of a cylindrical type designed so that its phase function depends on only one spatial coordinate, i.e. $\phi=\phi(y)$. Thus, the DOE is formed with a succession of phase zones 1, which define a periodic surface relief of the DOE in Y-direction and each of which extends along the length of the DOE in an X-direction. Due to such a design, the DOE converts an incident radiation beam 2 with a planar wavefront into a diffracted beam 4 with a cylindrical wavefront which converges to a line 6 parallel to the X-axis at the focal plane 8 of the DOE.

It will be described in more detail below, that the surface relief of the DOE and, particularly, along each phase zone thereof is designed so as to ensure that, at any location of the DOE and particularly at any location of any phase zone along the extension thereof, a local amplitude of the diffracted wavefront in an m-th diffraction order has a predetermined value Tm(x), whereby a desired distribution of diffraction efficiency $\eta_m=\eta_m(x)$ is achieved, it being known that, for a unit amplitude incident beam, the diffraction efficiency is defined as rim $\eta_m=|T_m|^2$.

It should be mentioned that the DOE according to the present invention may be of any general configuration, in which case the functions $\phi=\phi(y)$ and $\eta_m(x)$ will be replaced by general functions $\phi=\phi(x,y)$ and $\eta(x,y)$. The DOE may also be of a reflective rather than of a transmissive type.

Figure 2A:
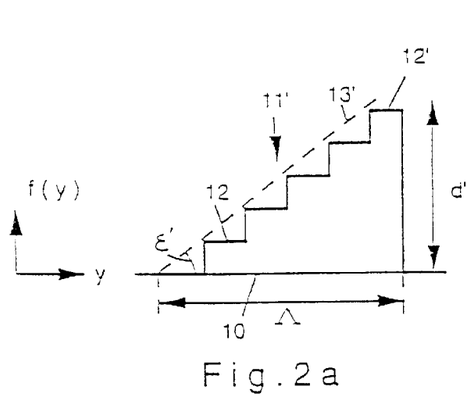
FIGS. 2a and 2b are cross-sectional views of a multilevel surface relief at two different locations of a diffractive optical element according to the present invention.
Figure 2B:
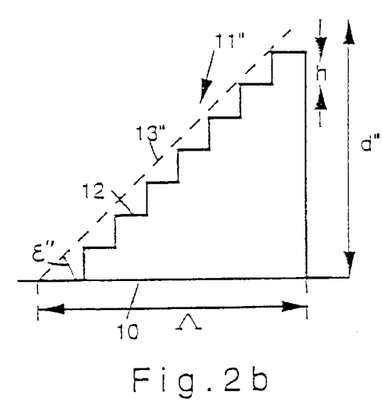

As seen in FIG. 1 and specifically shown in FIGS. 2a and 2b, the DOE has a base 10, whereon phase zones 1 are formed, each phase zone having a local grating period $\Lambda$ providing for the desired phase of the diffracted radiation. FIGS. 2a and 2b illustrate a geometry of one phase zone 1 at two different locations 11' and 11" thereof along the axis X. It should be understood that locations 11' and 11" could be chosen at any other places of the DOE, for example at two different phase zones, in which case the local grating period $\Lambda$ of one phase zone would be different from that of the other phase zone.

As seen in FIGS. 2a and 2b, at each location 11', 11", the phase zone 1 of the DOE has a local modulation depth d', d" and a local number $\xi'$, $\xi''$ of phase levels 12, spaced by a distance h i.e. $d=d(x)$ and $\xi=\xi(x)$. The local modulation depth is defined by an angle $\epsilon'$, $\epsilon''$ of inclination of a local profile 13', 13" of the phase zone with respect to the base 10 of the DOE.

Figure 3:
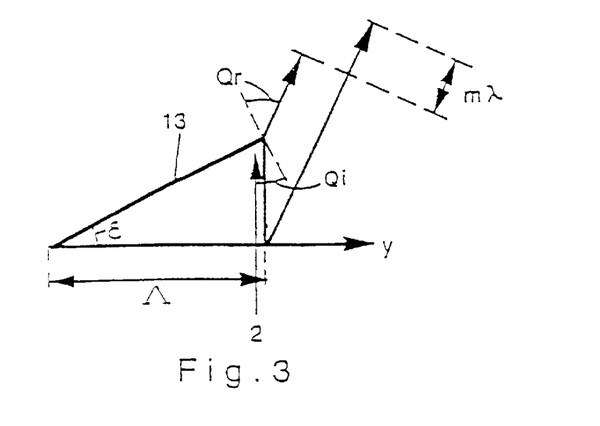
FIG. 3 is an illustration of a continuous surface relief corresponding to a multilevel surface relief of the kind shown in FIGS. 2a and 2b.

It should be understood that, in general, the local profile 13', 13" of the phase zone 1 corresponds to that which this phase zone would have, at the locations 11', 11" thereof, if the DOE were of a continuous type, such as shown in FIG. 3, rather than being multilevel. As seen in FIG. 3, the angle $\epsilon$ defines an angle $\theta_r$ at which the incident radiation is refracted by the phase zone:

$$n_1 \cdot \sin(\epsilon) = n_2 \sin(\epsilon+\theta_r) \quad (1)$$

where $n_1$, $n_2$ are respective refraction angles of the surrounding medium and the DOE.

The diffraction relation of the DOE is $$\sin\theta_d = \frac{\lambda m}{\Lambda} + \sin\theta_i \quad (2)$$

where $\lambda$ is a wavelength of the incident radiation, $\theta_i$ is an angle of incidence thereof and $\theta_d$ is a diffraction angle.

When the diffraction angle $\theta_d$ has a value $\theta_o$ which equals to the refraction angle $\theta_r$, maximal local amplitude of the diffracted wavefront and, consequently, 100% local diffraction efficiency is achieved. The modulation depth of such a phase zone is of its optimal magnitude $d_{opt}$ $$d_{opt} = \frac{\lambda}{n_1 \cdot \cos(\theta_1) - n_2 \cdot \cos(\theta_0)} \quad (3)$$

Thus, when the angle c at which the phase zone profile 13 is of its optimal value providing for the above requirement, the modulation depth of the phase zone is $d_{opt}$, while when the angle $\epsilon$ does not provide for the above requirement, the modulation depth of the phase zone differs from $d_{opt}$ and the amplitude of the diffracted wavefront and the diffraction efficiency of the phase zone are reduced. Therefore, to provide for a desired distribution of the diffraction efficiency, the local modulation depths of the phase zones of the DOE, according to the present invention, vary in the range from 0, when a phase zone has no phase levels and the radiation passing through the zone is not diffracted, to the optimal magnitude $d_{opt}$, at which all the radiation entering the phase zone is directed to a desired diffraction order. The local diffraction efficiencies of the phase zone for this order will, therefore, be in the range from 0 to 100%. Furthermore, it can be seen from the Equation 3, that if the angles $\theta_r$ and $\theta_d$ vary from one location of the DOE to another, i.e. $\theta_r=\theta_r(x,y)$ and $\theta_d=\theta_d(x,y)$, in order to achieve maximal local diffraction efficiencies, the optimal modulation depth $d_{opt}$ must vary accordingly, i.e. $d_{opt}=d_{opt}(x,y)$, It should be noted that, if the required inclination of a phase zone profile with respect to the optimal one is achieved by its pivoting around an edge point of the profile, not only the amplitude but also the phase of the diffracted wavefront changes, while if the profile pivots around the center thereof, no phase change of the diffracted wavefront will occur. Notwithstanding this, the former configuration is more preferable for implementation than the latter one, because it requires less number of etching operations for each phase zone and a width of the phase levels is larger which results in less complication during the realization procedure. The phase change caused by such a configuration can be easily compensated.

Reverting now to the multilevel structure of the phase zones of the DOE, it should be understood that, due to the fact that at least some of locations of the DOE, phase zone profiles are oriented not in their optimal manner, boundaries of phase levels which, at different locations of the DOE, are equidistant from the base 10 thereof do not define equiphase areas, which is contrary to the situation in known diffractive optical elements.

As known, a local amplitude of the diffracted wavefront and consequently a local diffraction efficiency of the DOE depends not only on the specific orientation of the local profile 13', 13" of the phase zone but also on the number and distance between the phase levels thereof. Thus, it can be shown that, a resulting amplitude of the diffracted wave in an m-th diffraction order is:

$$T_m = \frac{1}{\Lambda} \sum_{N=0}^{N_{max}-1} \int_{\frac{\Lambda}{\xi}N}^{\frac{\Lambda}{\xi}(N+1)} \mathrm{Exp}\left[-i2\pi\left(\frac{m}{\Lambda}x + \frac{h}{d_{opt}}N\right)\right]dx + \quad (4)$$

$$\int_{\frac{\Lambda}{\xi}N_{max}}^{\Lambda} \mathrm{Exp}\left[-i2\pi\left(\frac{m}{\Lambda}x + \frac{h}{d_{opt}}N_{max}\right)\right]dx$$

where h is a distance between the phase levels, $\xi$ is the local number of levels:

$$\xi = \frac{d}{h} \quad (5)$$

and N is a local number of complete levels in every phase zone:

$$N = \mathrm{Integer}\{\xi\} \quad (6)$$

Thus, the local number of levels in each phase zone includes the number N of complete levels in this phase zone, having identical local width (w'—in FIG. 2a and w"—in FIG. 2b) plus one incomplete level, if any, that is narrower than the complete levels. An incomplete level, if any, is narrower than the complete levels, being defined by a fraction of said real number. The incomplete level may be the uppermost, the lowermost or any arbitrarily disposed level of a phase zone. In the described example, an incomplete level 12' of the phase zone 11" in FIG. 2a is the uppermost level of this phase zone. In consequence with the above, the first term in Equation 4 represents the amplitude of the diffracted wave that is contributed by the complete levels in every phase zone, whereas the second term represents the amplitude which is contributed by the uppermost incomplete level.

The exact solution of Equation 4 yields the diffraction efficiency, assuming a unit amplitude incident beam, as $$\eta_m = |T_m|^2 \quad (7)$$

$$= \left| \frac{1}{2\pi m} \left\{ \left(\text{Exp}\left[-i2\pi \frac{m}{\xi}\right] - 1\right) \frac{1 - \text{Exp}\left[-i2\pi \frac{\delta}{\xi} N_{\max}\right]}{1 - \text{Exp}\left[-i2\pi \frac{\delta}{\xi}\right]} + \right. \right.$$

$$\left. \left. \left(\text{Exp}\left[-i2\pi \frac{m}{\xi}(\xi - N_{\max})\right] - 1\right) \text{Exp}\left[\frac{\delta}{\xi} N_{\max}\right] \right\} \right|$$

where $$\delta = m - \frac{d}{d_{opt}}$$

is a relative modulation depth. For a small distance between levels, i.e.

$$\frac{h}{d_{opt}} \ll 1,$$

we can replace N by ξ, so Equation 7 can be simplified to $$\eta_m = \left| \left(\text{Exp}\left[-i2\pi \frac{m}{\xi}\right] - 1\right) 1 - \frac{\text{Exp}[i2\pi\delta]}{1 - \text{Exp}\left[-i2\pi \frac{\delta}{\xi}\right]} \right|^2 \quad (8)$$

$$= \left( \frac{\sin\left(\frac{\pi m}{\xi}\right) \cdot \sin(\pi\delta)}{\pi m \cdot \sin\left(\frac{\pi\delta}{\xi}\right)} \right) \cdot |\text{Exp}[-i\pi\delta]|^2$$

Equation 8 is an exact solution when the modulation depth d is the complete sum of a number of distance between levels.

The height h of the phase levels is, preferably, invariant over the entire area of the DOE, it consequently being clear from Equation 4 that the amplitude of the diffracted wavefront is essentially the function of the number of phase levels ξ=ξ(x,y) so that, by the variation thereof, it is provided that the modulation depth d of the phase zones varies in the corresponding manner, i.e. d=d(x,y). Clearly, the number of phase levels required for the provision of the predetermined values of amplitude of the diffracted wavefront depends on a magnitude of the distance between the phase levels so that the less the distance h, the more phase levels are required. In order to minimize the number of levels, the distance h of the phase levels, according to the present invention, is of an optimized magnitude $h_{opt}$ which is determined by:

calculating, for each location of the DOE, an optimal local modulation depth $d_{opt}=d_{opt}(x,y)$, which the phase zone would have, in order to ensure 100% local diffraction efficiency in the m-th diffraction order, if the phase zone profile were continuous rather than being multi-level (Equation 3);

assuming that all the phase zones have their optimal local modulation depths $d_{opt}=d_{opt}(x,y)$ and the distance between the phase levels in the phase zones is a free parameter, calculating minimal numbers of phase levels $\xi_{min}=\xi_{min}(x,y)$ which are required to provide for the desired distribution of the diffraction efficiency (Equation 7);

calculating local heights of the phase levels $$h(x, y) = \frac{d_{opt}(x, y)}{\xi(x, y)},$$

the local height which has a minimal magnitude over the entire DOE being chosen as the optimized distance $h_{opt}$ of the phase levels.

It is clearly possible to choose a lower magnitude of the phase levels distance and to still obtain the desired diffraction efficiency, but this will cause an increase of the number of phase levels and complicate manufacturing of the DOE. On the other hand, the distance between the phase levels may be of a magnitude greater than $h_{opt}$, but this will lead to a reduction of the diffraction efficiencies.

It will now be explained how the DOE in which, in order to provide for the desired distribution of the diffraction efficiency, the number of phase levels continuously vary from phase zone to phase zone and/or within one phase zone, can be manufactured by means of known multilevel technology, which is based on generating a plurality of M binary amplitude masks including the multilevel information and utilizing the masks information serially for serial etching of the phase levels into the phase zones.

Parameters of the masks which need to be determined for such a production of the DOE with the phase zones which, according to the present invention, have different number of phase levels, are:

a maximal number of masks $M_{max}$ required for the production of a number No of phase levels, where No is an integer which is at least not less than a maximal number of the phase levels in the entire element $\xi_{max}$; in order to obtain high diffraction efficiency the maximal possible number of masks should be used; thus, by the use of four masks at most 16 levels per each phase zone of the DOE can be achieved;

a maximal modulation depth $d_0$ obtained by using $M_{max}$ masks with h as a distance between levels:

$$d_0 = N_0 \cdot h \quad (9)$$

and a binary amplitude transmittance of the masks:

$$T = T\{x\} = \begin{cases} 1 & \text{for } x > 0 \\ 0 & \text{for } x \leq 0 \end{cases} \quad (10)$$

It can be shown that, for the DOE according to the present invention, the transmittance of the M-th mask is determined as $$T_m(x, y,) = T\left\{\sin\left(P \text{Mod}\left[\frac{\phi}{2\pi}\right]\frac{d}{d_0}\right)\right\} \quad (11)$$

where

P is a parameter which is defined by a serial number of a mask, i.e. P=P(M), and which determines a number of boundaries of phase levels provided in each phase zone by the mask, φ is the phase function φ=φ(x,y) of the DOE and d is the modulation depth d=d(x,y). With the local diffraction efficiencies of the DOE being predetermined, local magnitudes of the modulation depth $d=d(x,y)$ can be determined by substituting the desired diffraction efficiency in the Equation 8 or by means of suitable computer programs based on rigorous equations of wave theory. Thus, by using Equation 11, it is possible to calculate the binary amplitude transmittance of the masks which they need to have in order to provide that, at any location of the DOE, the local diffraction efficiency will have its predetermined value.

Preferably, etching depths for the masks are related by a fixed ratio. Thus, with the DOE being produced in a manner similar to that described in U.S. Pat. No. 4,895,790. $P=2^{M-1}$ and the etching depth produced by a mask is twice the etching depth produced by the preceding mask. If another method of determining the etching depths of the masks is used, the parameter P will be defined accordingly.

With the mask transmittance being defined as above, it is possible to mathematically compensate fabrication errors which occur, when DOEs of the type to which the present invention relates are fabricated by means of conventional lithographic techniques. These errors are connected with the fact that during etching, a width at the top of the etched layers increases changing thereby their shape. It is known that, in order to correct such an error, the width of the etched level should be reduced by decreasing the open regions in the mask used for the etching. Mathematically, this can be represented by an increase of the duty cycle, as $$q_{new} = q_{old} + \Delta q \qquad (12)$$

$$= \frac{1}{2} + \frac{\Delta x}{\Lambda} = \frac{1}{2} + \Delta x \cdot \frac{|\nabla \phi|}{2\pi}$$

where $|\nabla \phi| = |\partial \backslash \partial x|$, $\Delta x$ is the width of the error introduced by the first mask (M=1), and $q_{old}=\frac{1}{2}$ the duty cycle in the original mask. The compensated duty cycle of Equation 12 is now introduced into Equation 11, together with the addition of a bias term sin $$\pi \frac{d}{d^0} \Delta q.$$

This yields $$T_m(x, y,) = T \left\{ \sin\left(2^{M-1} \frac{d}{d_0} \left\{ \text{Mod}\left[\frac{\phi + \pi \Delta q}{2^{M-1}}\right] - \frac{\pi \Delta q}{2^{M-1}} \right\} \right) + \sin\left(\pi \frac{d}{d_0} \Delta q\right) \right\} \qquad (13)$$

where $$\Delta q = \Delta x \frac{|\nabla \phi|}{2\pi} \qquad (14)$$

FIGS. 4 to 7 illustrate experimental results of testing a cylindrical DOE designed, according to the present invention, so that an intensity of the output wavefront thereof has a linear distribution. The DOE was recorded by means of conventional lithographic techniques with wet chemical etching for transforming the mask data onto a GaAs substrate. The finest resolution that was obtained with our equipment was about 3 microns. The size of the final DOE was 30 mm by 30 mm and its focal length was 240 mm.

Figure 4:
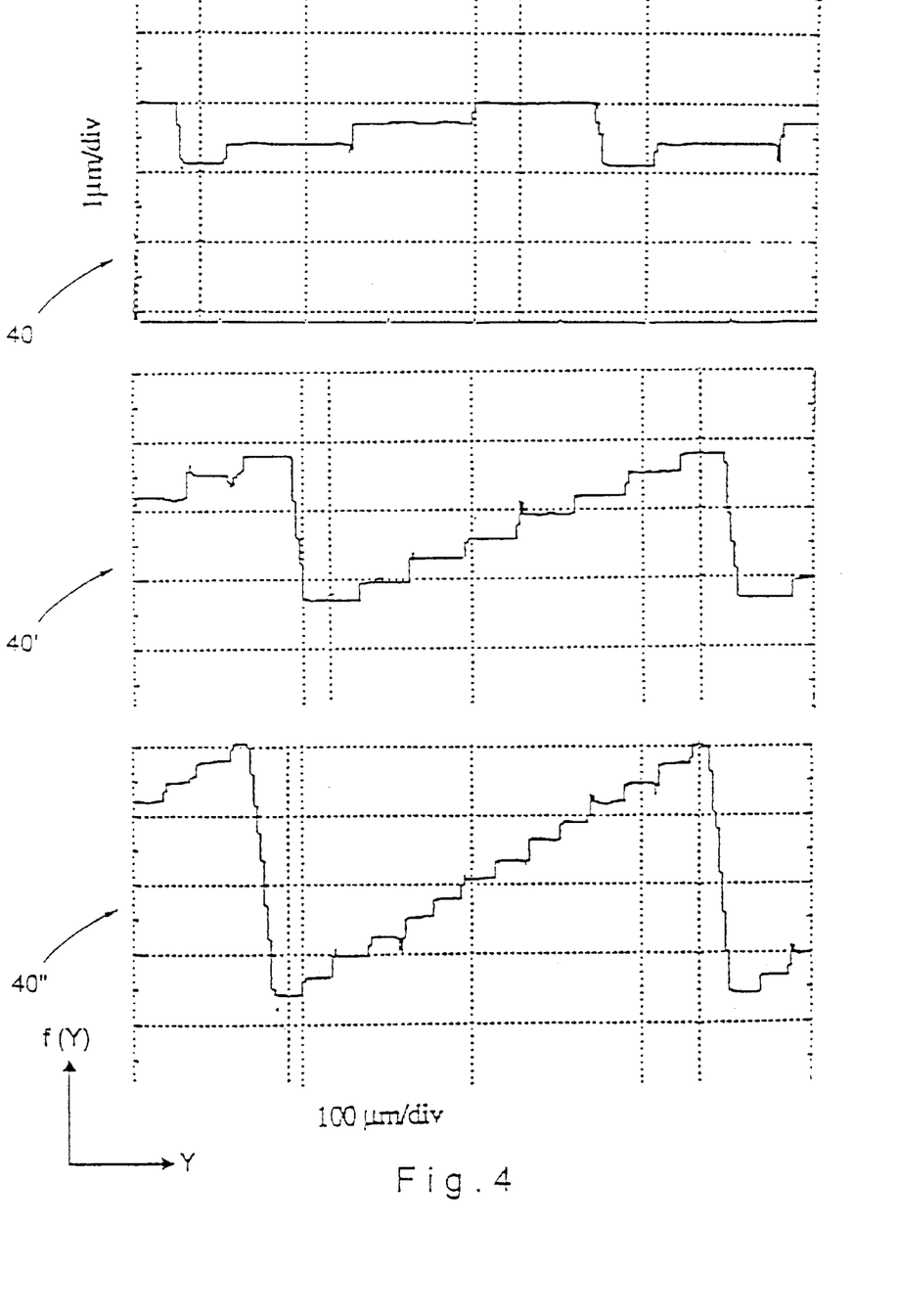
FIG. 4 shows results of a profilometer scanning of a diffractive optical element experimentally designed and recorded according to the present invention.

FIG. 4 shows profilometer scans of one phase zone of the recorded DOE at three different locations 40, 40' and 40" thereof, it being seen that at all the locations the grating period is identical. As seen, the height of the phase levels is constant at all the locations, while the number of levels varies in accordance with the variation of the modulation depth from one location of the phase zone to another. Thus, at the location 40 of the phase zone, the number of levels is 3.4, the lowermost level being incomplete, i.e. its width being less than that of the other levels, at the location 40' the number of phase levels is 7.75 and at the location 40" the number of levels is 13.6. The diffraction efficiencies $\eta_1$ of the DOE at the above locations are respectively 0.06, 0.39 and 0.87. As expected the diffraction efficiency increases as the modulation depth becomes greater.

Figure 5:
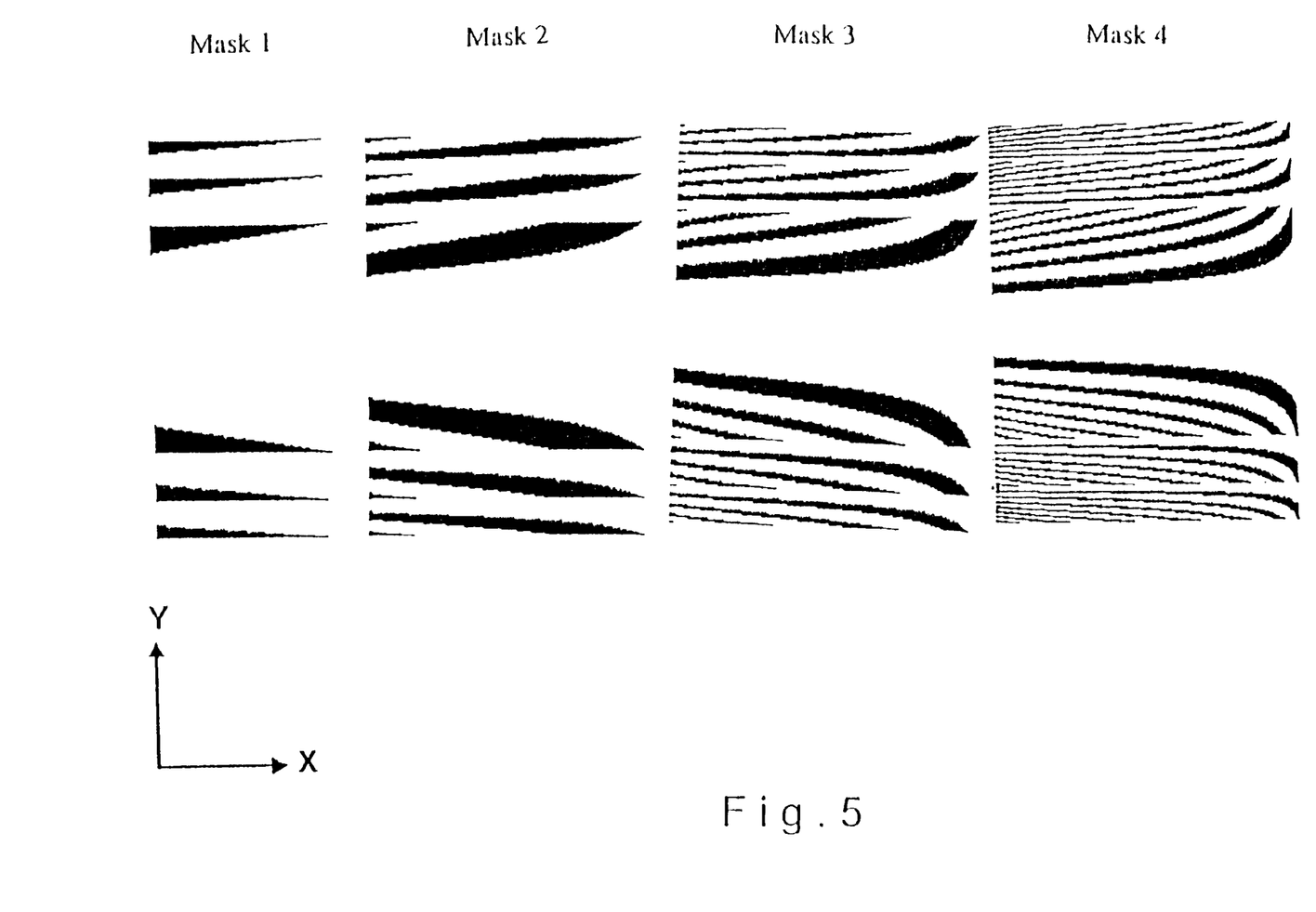
FIG. 5 is an illustration of central sections of masks used to fabricate the multilevel diffractive optical element experimentally designed and recorded according to the present invention.

FIG. 5 illustrates magnified sections of the central parts of the four masks used for the production of the DOE. As seen, the masks have fringes the width of which varies along the length of the mask and which may even be not continuous, contrary to conventionally designed masks. Moreover, the number of fringes in each zone corresponding to a phase zone of the optical element increases along the X-axis while the periodicity remains invariant.

Figure 6:
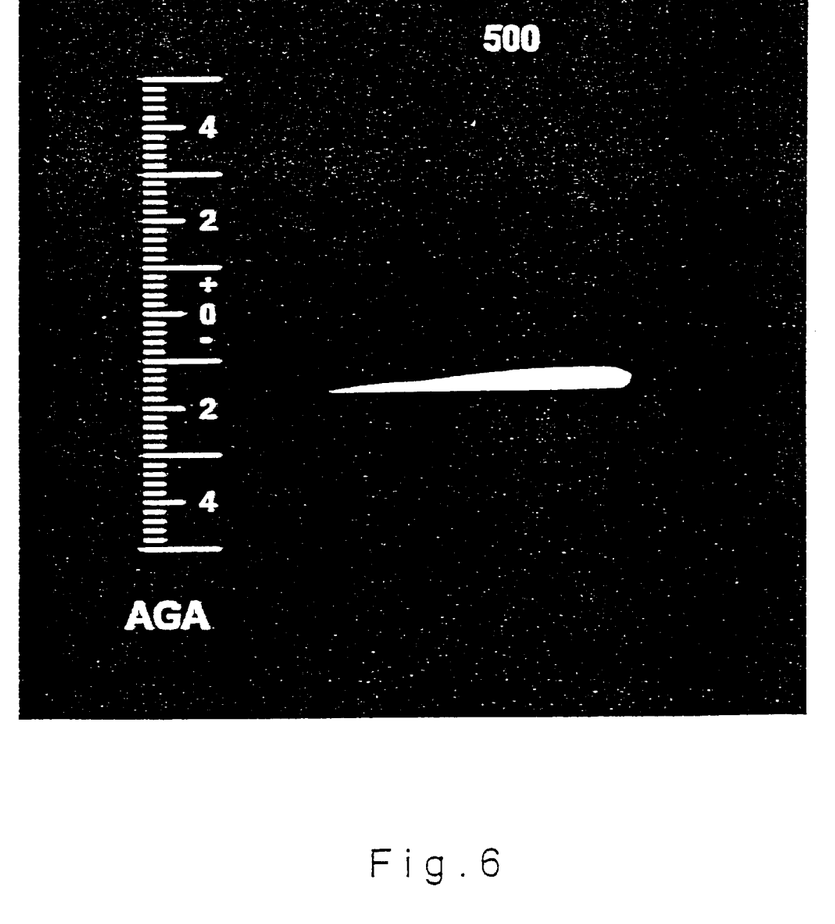
FIG. 6 shows results of thermal imaging of the intensity distribution at the focus of the diffractive optical element experimentally designed and recorded according to the present invention.
Figure 7:
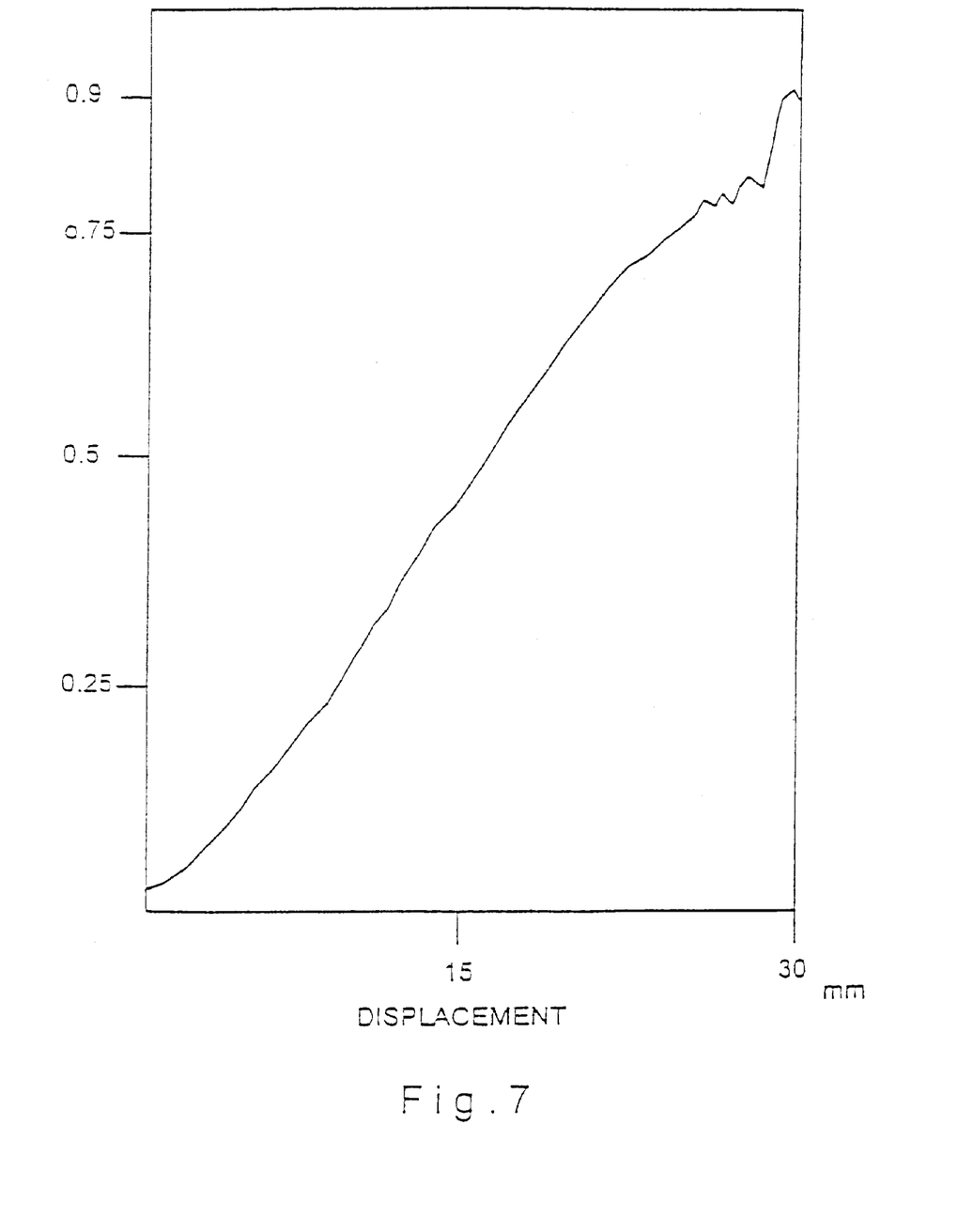
FIG. 7 shows intensity distribution measured along the line at the focus plane of the diffractive optical element experimentally designed and recorded according to the present invention.

The experimental arrangement used for the evaluation of the performance of the DOE comprised a $CO_2$ laser, a beam expander and collimator, and a detection system. The light emitted from the $CO_2$ laser, at 10.6 μm, was expanded and collimated and the resulting plane wave illuminated the entire DOE and, passing therethrough, converged to a line at the focal plane of the DOE. At the focal plane, an intensity distribution of the line was analyzed. Thus, for a qualitative measurement of the intensity distribution, the line was detected with a thermal camera. To enable a quantitative measurement of the intensity distribution, there was used a slit mounted at the focal plane and translated by a stepper motor. The slit collected light which passed therethrough at each location onto a thermal detector. The results of these experiments are shown in FIGS. 6 and 7. FIG. 6 shows the qualitative intensity distribution at the focus obtained with the thermal camera. It is interesting to note that the intensities of the other diffraction orders, including the zero order, are very weak and not observable, with the thermal camera. FIG. 7 shows the quantitative measurements with the scanned slit and thermal detector. As seen, the intensity distribution along the focus is indeed linear as expected. Deviation from linearity at the high intensity levels is attributed to diffraction at the edges of the DOE.

In an experiment of measuring a power in each of the detectable diffraction orders, namely −1,0,+1, and +2 diffraction orders, the direct narrow beam from the $CO_2$ laser (about 1 mm in diameter) was used to illuminate, with high intensity, a small region of the DOE. In such a way, the various diffracted orders could be readily separated. The illumination beam was moved along the X-direction of the DOE and, after every displacement of 1 mm, the power in each of the relevant diffraction orders was measured.

Figure 8:
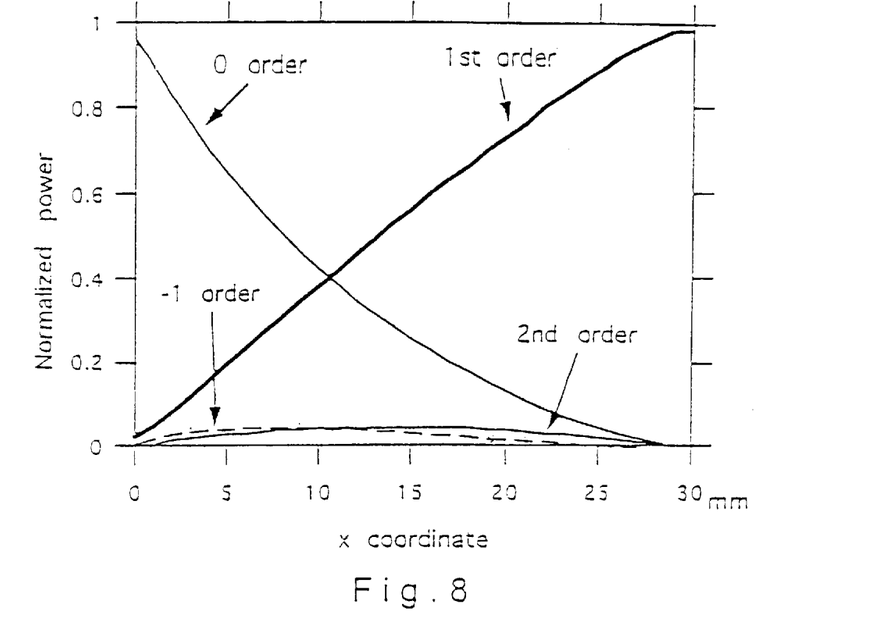
FIG. 8 illustrates predicted power in the diffracted orders as a function of the x-coordinate of a cylindrical diffractive optical element according to the present invention.
Figure 9:
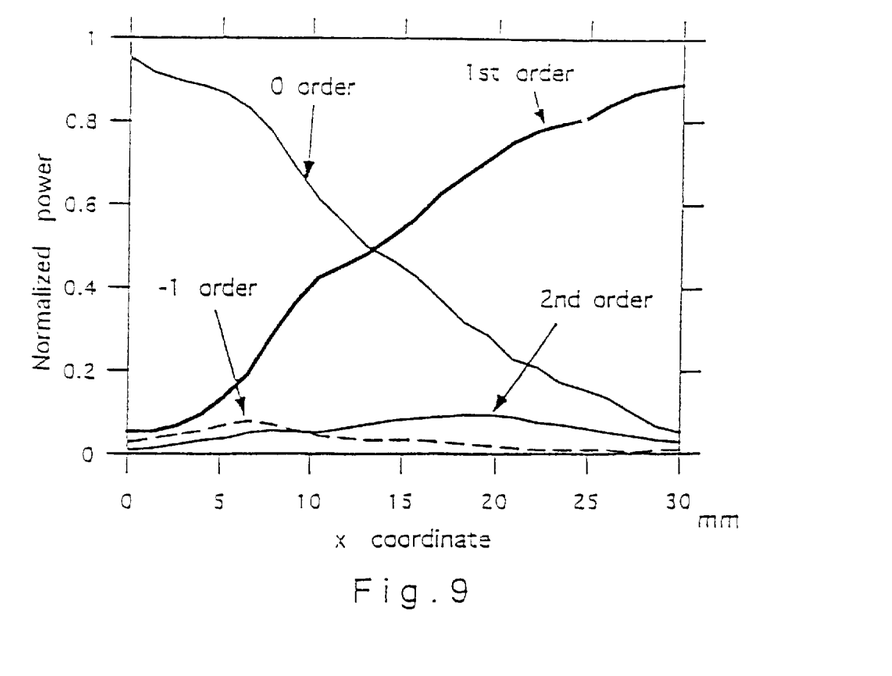
FIG. 9 illustrates experimental measurements of power in the diffracted orders as a function of the x-coordinate of the cylindrical DOE experimentally designed and recorded according to the present invention.

The predicted and experimental results for the power in four diffraction orders are presented in FIGS. 8 and 9. The predicted results, shown in FIG. 8, were calculated in accordance to Equation 8. As seen, the powers are mainly in the zero and first diffraction orders. FIG. 9 shows the corresponding experimental measurements. As seen, these results conform to the calculated results. The maximal normalized power at the edge of the element was 0.89 which is only 0.08 less than the predicted one. This reduction is caused by lithographic errors such as misalignment of the masks and etch depth errors. The deviations from linearity are caused by local scattering and nonuniformities in the DOE, which were averaged and smoothened when the entire element was illuminated.

What is claimed is:

1. A multilevel diffractive optical element comprising a base and a plurality of phase zones, each phase zone being defined by a local modulation depth d and having a local number N of complete levels of identical local width W and, in at least one phase zone, one incomplete level whose width w is less than the width W of the complete levels in said zone, the phase levels in each Phase zone being spaced, in the direction along the modulation depth, by a distance h which is substantially invariant along the entire optical element; a total number of phase levels in each phase zone being defined by a parameter $\xi=d/h$, which is a real number whose integer equals to said local number N of the complete levels and whose fraction indicates to the existence of said incomplete level; said parameter $\xi=\xi(x, y)$, said width W and said width w varying among different phase zones so as to provide corresponding variation of said local modulation depth $d=d(x, y)$ whereby local diffraction efficiencies and consequently an overall diffraction efficiency of the optical element is arbitrarily controlled.

2. A multilevel diffractive optical element according to claim 1, wherein the variation of the modulation depth is such as to ensure that a local diffraction efficiency obtained from the diffractive optical element at each of said locations thereof, has a predetermined value.

3. A multilevel diffractive optical element according to claim 2, wherein the modulation depth of each phase zone, at all locations thereof, has its optimal magnitude so that, at each of said locations, said local diffraction efficiency is maximal.

4. A multilevel diffractive optical element according to claim 2, wherein each phase zone is designed to have a predetermined local efficiency in a predetermined m-th diffraction order, whereby the optical element has a desired distribution of its overall efficiency, and wherein an optimal value $h_{opt}$ of the distance h between the phase levels is determined by calculating, for each phase zone, an optimal local modulation depth $d_{opt}$, which the phase zone would have, in order to ensure 100% local diffraction efficiency in said predetermined m-th diffraction order, if a profile of the phase zone were continuous rather than multilevel; calculating local minimal numbers of phase levels $\xi_{min}$ which are required to provide for the desired distribution of the diffraction efficiency, assuming that all the phase zones have their optimal local modulation depths $d_{opt}$ and that the distance h between the phase levels in the phase zones is a free parameter;
and calculating local distances between the phase levels in each phase zone as $h=d_{opt}/\xi_{min}$, the local distance of a minimal magnitude being chosen as the optimal value $h_{opt}$ of the distance h between the phase levels.

5. A multilevel diffractive optical element according to claim 1, wherein, at least one of said locations of the element, a phase zone profile is inclined with respect to the base of the element at an angle different from an optimal angle at which the modulation depth, at said at least one location, has its optimal magnitude.

6. A multilevel diffractive optical element according to claim 5, wherein said inclination of the phase zone profile is achieved by pivoting of the profile oriented at its optimal angle around a point located on the profile.

7. A multilevel diffractive optical element according to claim 1, which is adapted for production via the use of M masks in M serial manufacturing cycles, a maximal number of phase levels obtained thereby being $2^M$.

8. A multilevel diffractive optical element comprising a base and a plurality of phase zones, each consisting of a local number N of identical phase levels of a local width W and, in at least one phase zone, of an additional level of a local width w that is less than the local width W of said identical phase levels in said zone; each phase zone being defined by a local modulation depth d, and the phase levels in each zone being spaced, in the direction along the modulation depth, by a distance h which is substantially invariant along all the phase zones of the optical element; the local number N and the width W of the identical phase levels, and the width w of the additional level, if any, varying among different phase zones so as to provide corresponding variation of said local modulation depth, providing thereby a desired distribution of local diffraction efficiencies over the optical element.

9. The multilevel diffractive optical element as claimed in claim 8, wherein the variation of the modulation depth is such as to ensure that a local diffraction efficiency obtained from the diffractive optical element, at each location thereof, has a predetermined value.

10. The multilevel diffractive optical element as claimed in claim 9, wherein the modulation depth of each phase zone, at all locations thereof, has its optimal magnitude so that, at each of said locations, said local diffraction efficiency is maximal.

11. A multilevel diffractive optical element according to claim 9, wherein each phase zone is designed to have a predetermined local efficiency in a predetermined m-th diffraction order, whereby the optical element has a desired distribution of its overall efficiency, and wherein an optimal value $h_0pt$ of the distance h between the phase levels is determined by calculating, for each phase zone, an optimal local modulation depth $d_{opt}$, which the phase zone would have, in order to ensure 100% local diffraction efficiency in said predetermined m-th diffraction order, if a profile of the phase zone were continuous rather than multilevel; calculating local minimal numbers of phase levels $\xi_{min}$ which are required to provide for the desired distribution of the diffraction efficiency, assuming that all the phase zones have their optimal local modulation depths $d_{opt}$ and that the distance h between the phase levels in the phase zones is a free parameter; and calculating local distances between the phase levels in each phase zone as $h=d_{opt}/\xi_{min}$, the local distance of a minimal magnitude being chosen as the optimal value $h_{opt}$ of the distance h between the phase levels.

12. The multilevel diffractive optical element as claimed in claim 8, wherein, at least one of said locations of the element, a phase zone profile is inclined with respect to the base of the element at an angle different from an optimal angle at which the modulation depth, at said at least one location, has its optimal magnitude.

13. The multilevel diffractive optical element as claimed in claim 12, wherein said inclination of the phase zone profile is achieved by pivoting of the profile oriented at its optimal angle around a point located on the profile.

* * * * *

UNITED STATES PATENT AND TRADEMARK OFFICE
CERTIFICATE OF CORRECTION

PATENT NO. : 6,292,297 B1
DATED : September 18, 2001
INVENTOR(S) : Danziger et al.

It is certified that error appears in the above-identified patent and that said Letters Patent is hereby corrected as shown below:

Title page,
The title page, showing the illustrative figure, should be deleted and substitute therefor the attached title page.

Drawings,
The Drawing Sheet, consisting of Figs. 1, 2a, 2b and 3, should be deleted to be replaced with the Drawing Sheet, consisting of Figs. 1, 2a 2b and 3, as shown on the attached page.

Column 11,
Line 5, "Phase" should be -- phase --

Column 12,
Line 2, "$_2{}^M$" should be -- $2^M$ --
Line 33, "$h_opt$" should be -- $h_{opt}$ --
Line 49, after "at" insert -- at --.

Signed and Sealed this

Twelfth Day of November, 2002

Attest:

JAMES E. ROGAN
Attesting Officer
Director of the United States Patent and Trademark Office (12) United States Patent
Danziger et al.

(10) Patent No.: US 6,292,297 B1
(45) Date of Patent: *Sep. 18, 2001

(54) MULTILEVEL DIFFRACTIVE OPTICAL ELEMENT (75) Inventors: Yochay Danziger, Rishon LeZion; Erez Hasman, Kiron; Asher Friesem, Rehovot, all of (IL)

(73) Assignee: Yeda Research and Development Co., Ltd., Rehovot (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,064
(22) PCT Filed: Sep. 4, 1996
(86) PCT No.: PCT/IL96/00097
    § 371 Date: May 11, 1998
    § 102(e) Date: May 11, 1998
(87) PCT Pub. No.: WO97/12264
    PCT Pub. Date: Apr. 3, 1997

(30) Foreign Application Priority Data

Sep. 14, 1995 (IL) ............................................ 115295

(51) Int. Cl.$^7$ ........................... G02B 5/18; G02B 27/44
(52) U.S. Cl. .................. 359/575; 359/569; 359/566; 359/571; 359/573
(58) Field of Search ............................. 359/575, 565, 359/566, 571, 569, 573

(56) References Cited

U.S. PATENT DOCUMENTS

| 4,895,790 | 1/1990 | Swanson et al. ............... 430/321 |
| 5,073,007 | 12/1991 | Kedmi et al. .................. 359/565 |
| 5,202,775 | 4/1993 | Feldman et al. . |
| 5,227,915 | 7/1993 | Grossinger et al. ............ 359/565 |
| 5,310,623 | 5/1994 | Gal ................................ 430/321 |
| 5,482,800 | 1/1996 | Gal . |

FOREIGN PATENT DOCUMENTS 0 649 037 A2   4/1995 (EP) .

OTHER PUBLICATIONS

J.A.Jordan, P.M.Hirsch, L.B.Lesem and D.L.VanRooy "Knoform Lenses" Applied Optics; vol. 9, No. 8; Aug. 1970; pp. 1883–1887.

B.F..Brown and A.W.Lohmann; "Complex Spatial Filtering With Binary Masks"; Applied Optics; vol. 5, No. 6; Jun. 1996; p. 967.

*Primary Examiner*—Audrey Chang
(74) *Attorney, Agent, or Firm*—Nath & Associates PLLC; Gary M. Nath; Harold L. Novick (57) ABSTRACT

A multilevel diffractive optical element comprising a base and a plurality of phase zones having phase levels of a substantially identical height h, each phase zone being defined by a local modulation depth d and a local number of phase levels $\xi=d/h$, the local number of phase levels $\xi$ per phase zone being a real number, an integer of which defines the number of complete levels in the phase zone, which complete levels have identical widths, and a fraction of which, in at least one phase zone, defines an incomplete level which is narrower than the complete levels, said local number of phase levels $\xi=\xi(x, y)$ varying among different phase zones so as to provide corresponding variation of said local modulation depth $d=d(x, y)$ whereby local diffraction efficiencies and consequently an overall diffraction efficiency of the optical element is arbitrarily controlled.

13 Claims, 6 Drawing Sheets